United States Patent
Kim et al.

(10) Patent No.: US 9,670,008 B2
(45) Date of Patent: Jun. 6, 2017

(54) CONVEYOR SYSTEM

(71) Applicant: Soongsil University Research Consortium Techno-Park, Seoul (KR)

(72) Inventors: Jin Oh Kim, Seoul (KR); Jeong Gil Hwang, Seoul (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 0 days.

(21) Appl. No.: 15/084,741

(22) Filed: Mar. 30, 2016

(65) Prior Publication Data

US 2016/0289008 A1 Oct. 6, 2016

(30) Foreign Application Priority Data

Mar. 30, 2015 (KR) .................. 10-2015-0044164

(51) Int. Cl.
*B65G 47/26* (2006.01)
*B65G 47/31* (2006.01)
*B65G 35/06* (2006.01)

(52) U.S. Cl.
CPC ............. *B65G 47/31* (2013.01); *B65G 35/06* (2013.01)

(58) Field of Classification Search
CPC .... B65G 47/681; B65G 47/682; B65G 47/71; B65G 17/002; B65G 17/12; B65G 17/00
USPC ....... 198/447, 448, 452, 453, 465.1, 867.01, 198/867.13
See application file for complete search history.

(56) References Cited

U.S. PATENT DOCUMENTS

| 2,942,718 | A | * | 6/1960 | Buhrer | B22D 30/00 198/370.07 |
| 4,004,677 | A | * | 1/1977 | Heier | B65G 47/681 198/452 |
| 4,440,289 | A | * | 4/1984 | Weis | B65G 47/681 198/437 |
| 6,102,194 | A | * | 8/2000 | Charny | B65G 17/002 198/465.3 |
| 6,513,641 | B1 | * | 2/2003 | Affaticati | B07C 5/36 198/357 |
| 6,966,423 | B2 | * | 11/2005 | Monti | B65B 35/54 198/447 |
| 7,156,606 | B2 | * | 1/2007 | Bridier | B65B 35/44 198/447 |

FOREIGN PATENT DOCUMENTS

| JP | 02-127227 A | 5/1990 |
| JP | 07-003937 U | 1/1995 |
| JP | 10-236642 A | 9/1998 |
| JP | 2005-231779 A | 9/2005 |

* cited by examiner

*Primary Examiner* — James R Bidwell
(74) *Attorney, Agent, or Firm* — Pearne & Gordon LLP (57) ABSTRACT

The present disclosure suggests a conveyor system. A conveyor system in accordance with an exemplary embodiment of the present disclosure includes: a plurality of transportation modules; a front conveyer including a multiplicity of conveyors, which are driven at a first speed, arranged side by side to be in parallel to each other and configured to transfer the transportation modules; and a central conveyor driven at a second speed, provided adjacent to an end portion of the front conveyor and configured to transfer the transportation modules transferred from the front conveyor.

19 Claims, 11 Drawing Sheets

CONVEYOR SYSTEM

CROSS-REFERENCE TO RELATED APPLICATION

This application claims the benefit of Korean Patent Application No. 10-2015-0044164 filed on Mar. 30, 2015, the entire disclosures of which are incorporated herein by reference.

TECHNICAL FIELD

The various embodiments described herein pertain generally to a conveyor system.

BACKGROUND

A conveyor system is equipment that transfers materials from one location to another at a regular speed. Generally, the conveyor system works in connection with an automation system of a large factory. The conveyor system allows workers to continue to work at their stationary positions without needing to move around while allowing materials or products to be moved between the workers at a regular speed. Thus, a process of producing the materials or the products can be performed conveniently, systematically and efficiently.

Further, in the conveyor system, a conveyor can be moved at a high speed or a low speed depending on a required processing time. Furthermore, high-speed or low-speed conveyors are linked to each other and perform different processing. At this time, however, materials or products that are transferred between conveyors of different speeds suffer a problem that is caused by a difference in the speeds of the conveyors.

In this regard, Japanese Patent Laid-open Publication No. 2005-231779 (entitled "Merging Conveyor Device") describes a merging conveyor device that an article conveyed by a low speed conveyor traveling in parallel to a high speed chain conveyor traveling is sideway-shifted from the obliquely lateral direction and is put in the articles on the high speed chain conveyor so as to be conveyed. An upper surface of a side end of the low speed conveyor on the high speed chain conveyor side is provided with a peak holder which is higher than an upper surface of the high speed chain conveyor, the high speed chain conveyor is provided with two double speed chains arranged in parallel to each other, and a bottom keeper is arranged between the double speed chains on a position for receiving a bottom part of the article sideway-shifted from the lateral direction and placed on the high speed chain conveyor.

DISCLOSURE OF THE INVENTION

Problems to be Solved by the Invention

Example embodiments of the present disclosure provide a conveyor system capable of adjusting a moving speed of a conveyor depending on a process involved.

However, the problems sought to be solved by the present disclosure are not limited to the above description and other problems can be clearly understood by those skilled in the art from the following description.

Means for Solving the Problems

In one example embodiment of the present disclosure, a conveyor system includes a plurality of transportation modules; a front conveyer including a multiplicity of conveyors, which are driven at a first speed, arranged side by side to be in parallel to each other and configured to transfer the transportation modules; and a central conveyor driven at a second speed, provided adjacent to an end portion of the front conveyor and configured to transfer the transportation modules transferred from the front conveyor.

Effect of the Invention

According to the example embodiment, a moving speed of a conveyor can be adjusted depending on a process involved. Further, since this single conveyor can replace multiple conveyors of different moving speeds, the process can be optimized and the space can be utilized efficiently.

MODE FOR CARRYING OUT THE INVENTION

Hereinafter, example embodiments will be described in detail so that inventive concept may be readily implemented by those skilled in the art. However, it is to be noted that the present disclosure is not limited to the example embodiments and examples but can be realized in various other ways. In drawings, parts not directly relevant to the description are omitted to enhance the clarity of the drawings, and like reference numerals denote like parts through the whole document.

Through the whole document, the terms "connected to" or "coupled to" are used to designate a connection or coupling of one element to another element and include both a case where an element is "directly connected or coupled" to another element and a case where an element is "electrically connected or coupled" to another element via still another element.

Through the whole document, the term "on" that is used to designate a position of one element with respect to another element includes both a case that the one element is adjacent to the another element and a case that any other element exists between these two elements.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise. Further, through the whole document, the term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Example embodiments of the present disclosure relates to a conveyor system 10.

Figure 1:
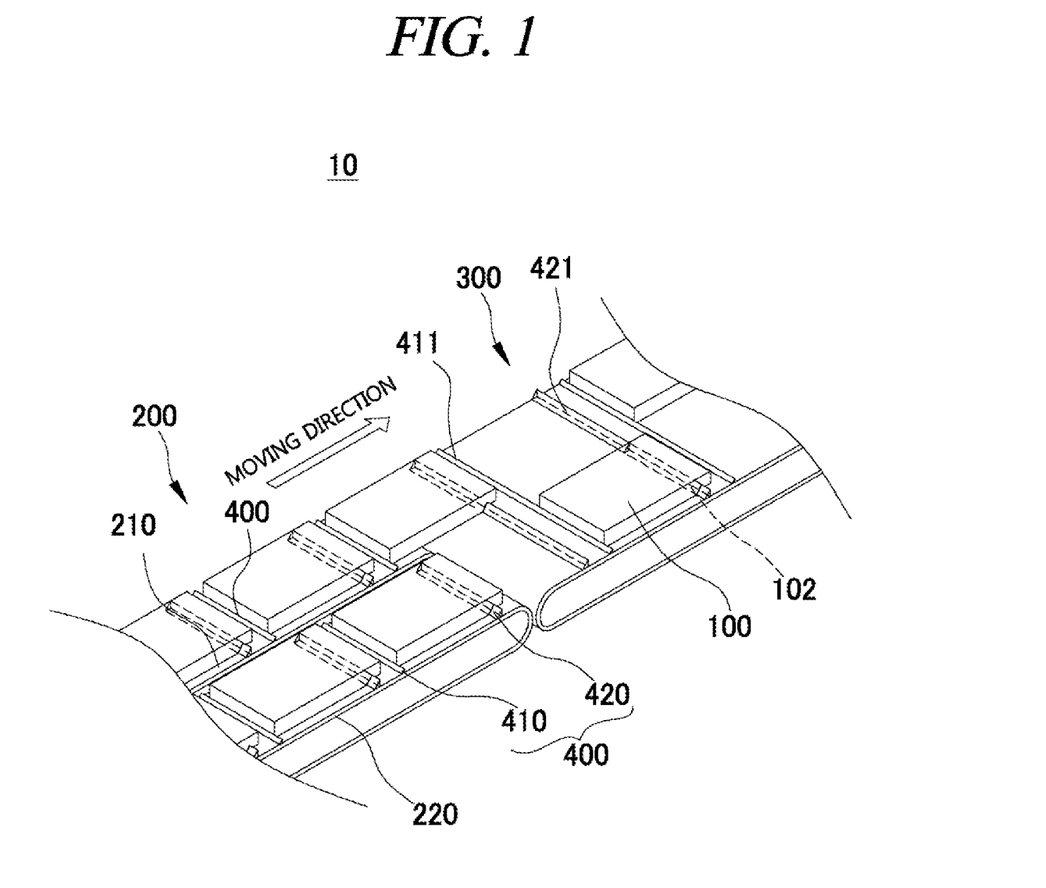
FIG. 1 is a perspective view of a conveyor system according to a first example embodiment.
Figure 2:
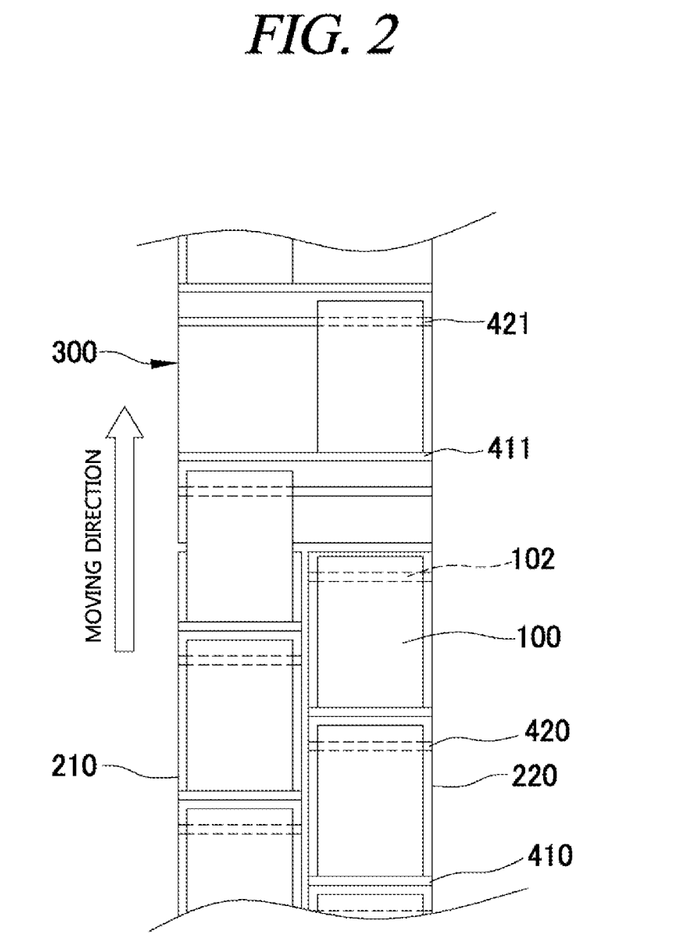
FIG. 2 is a plan view of the conveyor system according to the first example embodiment.

Referring to FIG. 1 and FIG. 2, a conveyor system 10 according to a first example embodiment will be described.

The conveyor system 10 includes a multiple number of transportation modules 100; a front conveyor 200; and a central conveyor 300. The front conveyor includes a plurality of conveyors 210 and 220 which are driven at a first speed, arranged side by side in parallel to each other and configured to transfer the transportation modules 100. The central conveyor 300 is provided adjacent to an end portion of the front conveyor 200 and configured to transfer the transportation modules 100 conveyed from the front conveyor. The central conveyor 300 is driven at a second speed.

Further, each transportation module 100 includes a top surface on which a transportation target object is placed; a bottom surface in contact with the conveyors; a left side surface and a right side surface provided between the top surface and the bottom surface; and a front side surface and a rear side surface provided between the top surface and the bottom surface.

The second speed at which the central conveyor 300 is driven may be higher than the first speed at which the front conveyor 200 is driven.

That is to say, the front conveyor 200 may be configured to be operated at a low speed, whereas the central conveyor 300 may be configured to be operated at a high speed. Here, an article or a product that is processed in a manufacturing process is placed on the transportation module 100.

By way of example, the front conveyor 200 is configured to be moved at a low speed so that a worker can perform a process of processing the article or product during a preset time. Meanwhile, the central conveyor 300 is configured to be moved at a high speed while carrying the article or product thereon.

Furthermore, the front conveyor belt 200 includes the plurality of conveyors 210 and 220 that are arranged side by side in parallel to each other. Transportation modules 100 located on the respective conveyors 210 and 220 are all carried onto the single central conveyor 300. Thus, the processing efficiency can be improved.

Each of the front conveyor 200 and the central conveyor 300 includes a multiplicity of stopper members 400 which the transportation modules 100 from being pushed forward or backward and guide sliding transfer of the transportation modules 100.

Further, each transportation module 100 has an insertion groove 102 into which a stopper member 400 is inserted.

Further, the stopper member 400 and the insertion groove 102 may be formed in a direction orthogonal to a transfer direction of the front conveyor 200 and the central conveyor 300.

To elaborate, the stopper member 400 may be provided in the form of a protrusion on a surface of each of the front conveyor 200 and the central conveyor 300 in the direction orthogonal to the moving direction of the conveyors 200 and 300. Further, the stopper member 400 includes a first stopper member 410 to be located against the transportation module 100; and a second stopper member 420 to be inserted into the insertion groove 102 of the transportation module 100.

Here, when the transportation module 100 is transferred from the front conveyor 200 to the central conveyor 300, the second stopper member 420 of the front conveyor 200 may be separated from the insertion groove 102. At this time, however, the first stopper member 410 prevents the transportation module 100 from being pushed backwards, and the transportation module 100 can be properly moved forward onto the central conveyor 300. The second stopper member 420 of the central conveyor 300 is inserted into the insertion groove 102 of the transportation module 100 which is transferred onto the central conveyor 300.

The second stopper member 420 not only prevents the transportation module 100 from being pushed forward or backward on the front conveyor 200 or the central conveyor 300, but the second stopper member 420 also guides the transportation module 10 to be moved in a direction orthogonal to the moving direction of the transportation module 100 when the transportation module 100 is slid by a converging member 600, a diverging member 700 or a guide line 800 to be described later. Detailed description of this configuration will be described later in detail.

By way of non-limiting example, a cross section of the first stopper member 410 in the transfer direction may be of a right-angled triangular shape so that the first stopper member 410 can come into firm contact with a rear end portion of the transportation module 100. Further, a cross section of the second stopper member 420 in the moving direction may be of a triangular shape the width of which decreases upwardly. The insertion groove 102 may be formed to correspond to the shape of the second stopper member 420.

The aforementioned term "front side" may refer to a direction opposite to the moving direction of the transportation module 100, whereas the term "rear side" may refer to the transfer direction of the transportation module 100.

Referring to FIG. 2, the front conveyor 200 includes the first conveyor 210 and the second conveyor 220 arranged side by side in parallel to each other. Furthermore, by way of example, but not limitation, the first conveyor 210 and the second conveyor 220 may be driven such that a phase difference equivalent to half (½) of the length of the transportation module 100 is generated between a transportation module 200 located on the first conveyor 210 and a transportation module 100 located on the second conveyor 220.

That is to say, a plurality of transportation modules 100 are respectively placed on the first conveyor 210 and the second conveyor 220 along the transfer direction. The first conveyor 210 and the second conveyor 200 may be driven such that a front end portion of the transportation module 100 on the first conveyor 210 is located at a position parallel to a ½ point of the transportation module 100 which is placed on the second conveyor 220. Here, the moving speed of the central conveyor 300 may be set to be twice as high as the moving speed of the front conveyor 200.

By way of example, but not limitation, in case that the front conveyor 200 includes N number of conveyors, the respective conveyors may be driven such that a phase difference corresponding to 1/N of the length of the transportation module 100 is generated between a transportation module 100 located on a certain conveyor and a transportation module 100 adjacent thereto. At this time, the speed of the central conveyor 300 may be set to be N times as high as the speed of the front conveyor 200. However, the speeds of the central conveyor 300 and the front conveyor 200 may be limited thereto, and the speed of the central conveyor 300 may be set to be N times higher than the speed of the front conveyor 200.

In the conveyor system 10, the transportation modules 100 can be joined together (converged) or separated (diverged) by a branch member. Here, the branch member may be the converging member 600 or the diverging member 700 to be described later.

Figure 3:
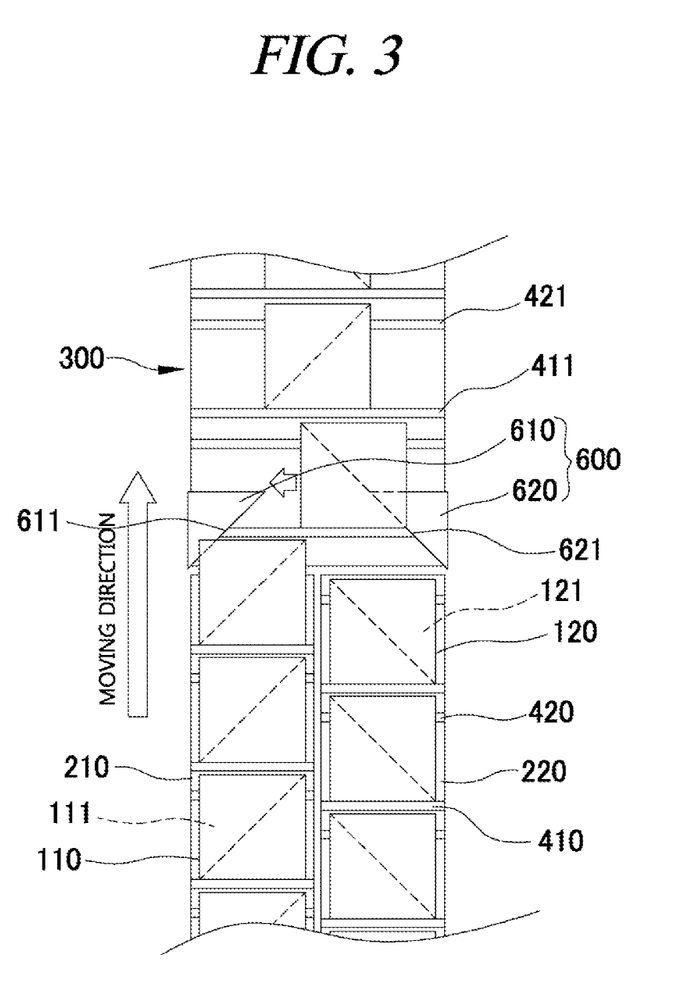
FIG. 3 is a plan view of a conveyor system according to a second example embodiment.
Figure 4A:
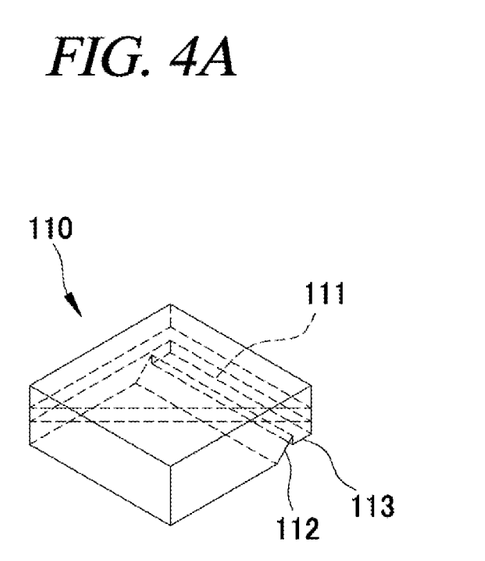
FIG. 4A is a perspective view of a first transportation module included in the conveyor system according to the second example embodiment.
Figure 4B:
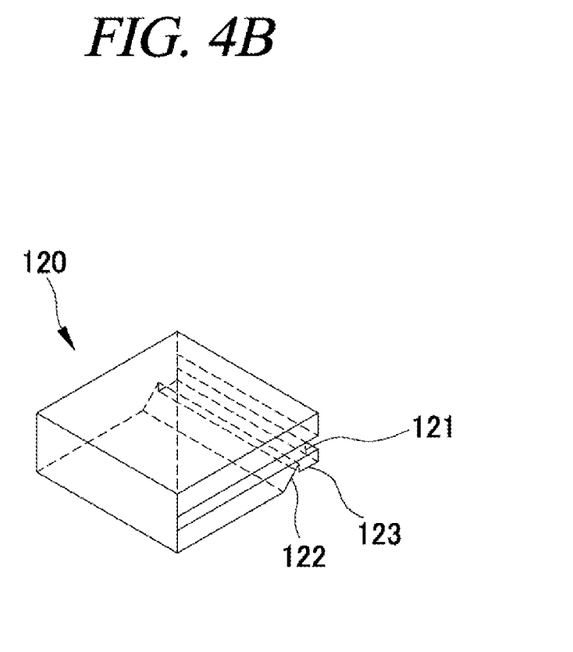
FIG. 4B is a perspective view of a second transportation module included in the conveyor system according to the second example embodiment.

Referring to FIG. 3, FIGS. 4A and 4B, a conveyor system 10 according to a second example embodiment will be described.

The conveyor system 10 includes a converging member 600 which is provided at a position where transportation modules 100 are transferred from a front conveyor 200 to a central conveyor 300 and is configured to converge transportation modules 100 from a first conveyor 210 and transportation modules 110 from a second conveyor 220 into a single row.

Further, the converging member 600 includes a first converging member 610 provided on the side of the first conveyor 210 and configured to slide a transportation module 110 from the first conveyor 210 to a central portion of the central conveyor 300; and a second converging member 620 provided on the side of the second conveyor 220 and configured to slide a transportation module 120 from the second conveyor 220 to the central portion of the central conveyor 300.

The first converging member 610 includes an edge 611 extending from a first side end portion of the first conveyor 210 toward the central portion of the central conveyor 300; and an edge 621 extending from a second side end portion of the second conveyor 220 toward the central portion of the central conveyor 300.

The aforementioned first side end portion of the first conveyor 210 refers to an outer side portion (direction of 9 o'clock of FIG. 3) of the first conveyor 210, and the second side end portion of the second conveyor 220 refers to an outer side portion (direction of 3 o'clock of FIG. 3) of the second conveyor 220.

By way of example, as depicted in FIG. 3, the first converging member 610 is provided at a position where a transportation module 100 is transferred from the front conveyor 200 to the central conveyor 300, and the first converging member 610 includes the edge 611 which comes into contact with the transportation module 110 from the first conveyor 210. The edge 611 is inclined toward the central portion of the central conveyor 300. Accordingly, as the transportation module 110 from the first conveyor 210 is transferred to the central conveyor 300, the transportation module 110 can be slid onto the central portion of the central conveyor 300. At this time, as a stopper member 421 of the central conveyor 300 is fitted into an insertion groove of the transportation module 100, the transportation module 110 can be slid onto the central portion of the central conveyor 300 along the stopper member 421.

Further, the second converging member 620 is provided at a position where a transportation module 100 is transferred from the second conveyor 220 to the central conveyor 300, and includes the edge 621 that comes into contact with the transportation module 110 transferred from the second conveyor 220. The edge 621 is inclined toward the central portion of the central conveyor 300. Accordingly, as the transportation module 110 from the second conveyor 220 is transferred to the central conveyor 300, the transportation module 110 can be slid onto the central portion of the central conveyor 300. At this time, the stopper member 421 of the central conveyor 300 is fitted into an insertion groove of the transportation module 100, and the transportation module 110 can be slid onto the central portion of the central conveyor 300 along the stopper member 421.

Referring to FIG. 4A, the transportation module 110 transferred by the first conveyor 210 and the transportation module 120 transferred by the second conveyor 220 will be explained.

The transportation module 110 transferred by the first conveyor 210 includes a guide groove 111 that allows the transportation module 110 to be slid to the central portion of the central conveyor 300 smoothly, and the transportation module 120 transferred by the second conveyor 220 includes a guide groove 121 that allows the transportation module 120 to be slid to the central portion of the central conveyor 300 smoothly.

To be more specific, the transportation module 110 transferred by the first conveyor 210 includes the guide groove 111 which allows the edge 611 of the first converging member 610 to be inserted therein and which is extended from the side end portion of the first conveyor 210 toward the central portion of the central conveyor 300.

That is, referring to FIG. 4A, the transportation module 110 transferred by the first conveyor 210 has the guide groove 111 recessed from the left side surface and the front side surface of the transportation module 110 in a preset thickness and a preset depth. The guide groove 111 is recessed up to a diagonal line connecting a rear end point of the left side surface and a right end point of the front side surface in the depth direction. The guide groove 111 is formed to be located at a position higher than an upper end of the insertion groove 112.

The aforementioned front side may refer to a direction of 2 o'clock of FIG. 4A; the rear side, a direction of 8 o'clock of FIG. 4A; the left side, a direction of 10 o'clock of FIG. 4A; the right side, a direction of 4 o'clock of FIG. 4A.

Further, the transportation module 120 transferred by the second conveyor 220 includes the guide groove 121 which allows the edge 621 of the second converging member 620 to be inserted therein and which is extended from the side end portion of the second conveyor 220 toward the central portion of the central conveyor 300.

That is, referring to FIG. 4B, the transportation module 120 transferred by the second conveyor 220 has the guide groove 121 recessed from a right side surface and the front side surface of the transportation module 120 in a preset thickness and a preset depth. The guide groove 121 is recessed up to a diagonal line connecting a rear end point of the right side surface and a right end point of the front side surface in the depth direction. The guide groove 121 is formed to be located at a position higher than the upper end of the insertion groove 122.

The aforementioned front side may refer to a direction of 2 o'clock of FIG. 4B; the rear side, a direction of 8 o'clock of FIG. 4B; the left side, a direction of 10 o'clock of FIG. 4B; the right side, a direction of 4 o'clock of FIG. 4B.

By way of example, the guide groove 111 of the transportation module 110 transferred by the first conveyor 210 is formed to conform to the first converging member 610. Here, the guide groove 111 may be formed, to allow the first converging member 610 to be inserted therein, such that a side surface thereof in the transfer direction and a side surface thereof in an outward direction (direction of 10 o'clock of FIG. 4A) of the second conveyor 220 are opened.

Furthermore, the guide groove 211 of the transportation module 210 transferred by the second conveyor 220 is formed to conform to the second converging member 620. Here, the guide groove 211 may be formed, to allow the second converging member 620 to be inserted therein, such that a side surface thereof in the transfer direction and a side surface thereof in an outward direction (direction of 4 o'clock of FIG. 4B) of the second conveyor 220 are opened.

With the above-described configuration, a multiple number of transportation modules 110 and 120 placed on the plurality of conveyors 210 and 220 can be transferred on the central conveyor 300 while being arranged in a single row. Thus, the length of the central conveyor 300 in a widthwise direction can be shortened, so that space efficiency can be improved.

Here, the widthwise direction may refer to a direction orthogonal to the transfer direction of the transportation modules 110 and 120 on the central conveyor 300.

Referring back to FIG. 1, the height of the first stopper member 411 may be set to be lower than the height of the second stopper member 421. Accordingly, even in case that there is generated a phase difference in transportation modules because a ratio of a moving speed of the first conveyor 210 to a moving speed of the central conveyor 300 and a ratio of a moving speed of the second conveyor 220 to the moving speed of the central conveyor 300 are not exactly same, the second stopper member 421 of the central conveyor 300 can be exactly inserted into the insertion groove 112 (122) of the transportation module.

Furthermore, referring to FIGS. 4A and 4B, the transportation module 110 (120) may be provided with a step portion 113 (123) at a front end portion of the insertion groove 112 (122). To elaborate, a portion of a bottom surface of the transportation module 110 (120) which is located at the front of the insertion groove 112 (122) may be formed to be higher than a portion of the bottom surface of the transportation module 110 (120) which is located at the back of the insertion groove 112 (122). Here, desirably, the height of the step portion 113 (123) may be larger than the height of the first stopper member 411 of the central conveyor 300.

With this configuration, even if the first stopper member 411 of the central conveyor 300 is inserted into the insertion groove 111 (122) of the transportation module 110 (120) when the transportation module 110 (12) of the first conveyor 210 (220) is transferred to the central conveyor 300, the first stopper member 411 may not be held in the insertion groove 111 (122), but the second stopper member 421 of the central conveyor 300 may be inserted and fixed therein.

Figure 5:
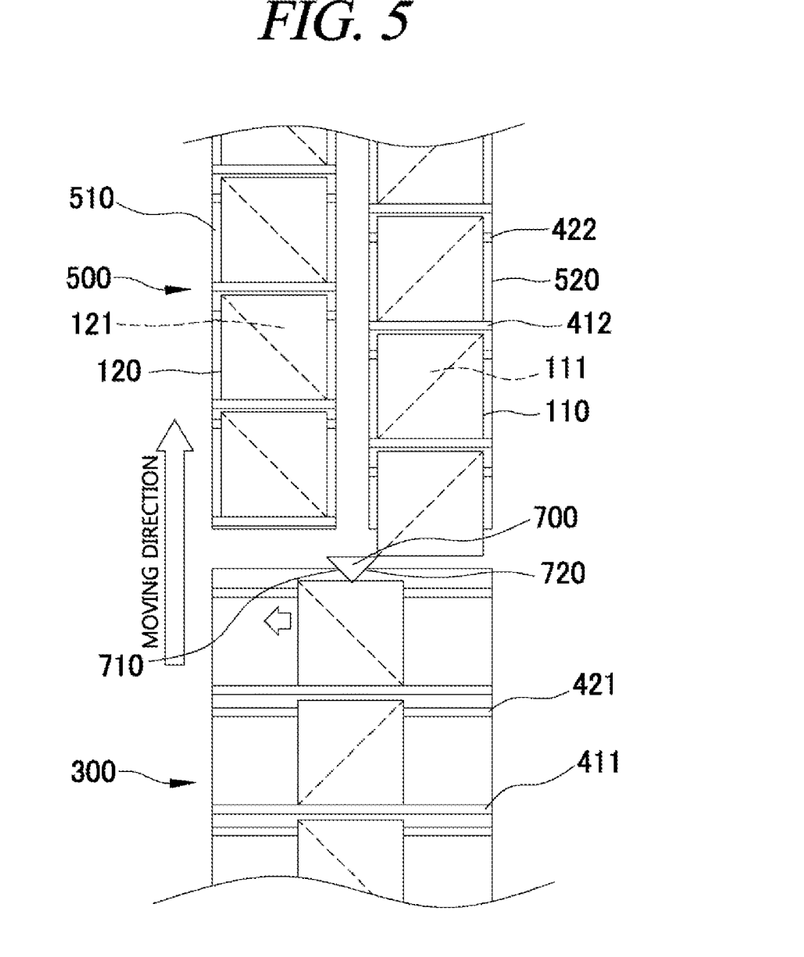
FIG. 5 is a plan view of a conveyor system according to a third example embodiment.

Now, referring to FIG. 5, a conveyor system 10 according to a third exemplary embodiment will be described.

The conveyor system 10 according to the third exemplary embodiment further includes a rear conveyor 500 which is driven at a third speed, provided to be adjacent to an end portion of the central conveyor 300, and configured to transfer thereon transportation modules 110 and 120 transferred from a central conveyor 300.

Here, the third speed may be set to be lower than a second speed at which the central conveyor 300 is moved, or may be set to be equal to a first speed at which a front conveyor 200 is moved.

The rear conveyor 500 includes a plurality of conveyors 510 and 520 that are arranged side by side to be parallel to each other and configured to transfer transportation modules 100 thereon. By way of non-limiting example, as illustrated in FIG. 5, the rear conveyor 500 includes a fourth conveyor 510 and a fifth conveyor 520.

Further, the conveyor system 10 also includes a diverging member 700 configured to diverge transportation modules 110 and 120 transferred from the central conveyor 300 onto a plurality of conveyors of the rear conveyor 500.

The diverging member 700 is provided at a position where the transportation modules 110 and 120 are transferred from the central conveyor 300 to the rear conveyor 500. The diverging member 700 is capable of diverging the transportation modules 100 transferred from the central conveyor 300 onto the plurality of conveyors 510 and 520. By way of example, as depicted in FIG. 5, the diverging member 700 diverges the transportation module 110 and 120 transferred from the central conveyor 300 onto a fourth conveyor 510 and a fifth conveyor 520.

To this end, the diverging member 700 includes a first edge 710 extending from a central portion of the central conveyor 300 to a first side end portion of the fourth conveyor 510 of the rear conveyor 500; and a second edge 720 extending from the central portion of the central conveyor 300 to a second side end portion of the fifth conveyor 520.

That is to say, the diverging member 700 is provided at the position where the transportation modules 110 and 120 are transferred from the central conveyor 300 to the rear conveyor 500. The transportation module 120 from the central conveyor 300 may be transferred to the fourth conveyor 510 of the rear conveyor 500 by the first edge 710 of the diverging member, or the transportation module 110 from the central conveyor 300 may be transferred to the fifth conveyor 520 of the rear conveyor 500 by the second edge 720 of the diverging member 700.

By way of non-limiting example, the diverging member 700 is located between the fourth conveyor 510 and the fifth conveyor 520 of the rear conveyor 500, and it has a V-shape in the direction of the central conveyor 300. With this configuration, the transportation module 110 (120) transferred from the central conveyor 300 is sent to the fourth conveyor 510 or the fifth conveyor 520 of the rear conveyor 500.

To be more specific, first transportation modules 120 and second transportation modules 110 are alternately arranged on the central conveyor 300. Each first transportation module 120 is provided with a guide groove 121 extended from the central conveyor 300 to a side end portion of the fourth conveyor 510 of the rear conveyor 500, and each second transportation module 110 is provided with a guide groove 111 extended from the central conveyor 300 to a side end portion of the fifth conveyor 520 of the rear conveyor 500.

Further, as the guide groove 121 of the first transportation module 120 comes into contact with the first edge 710 of the diverging member 700, the first transportation module 120 may be slid onto the fourth conveyor 510 of the rear conveyor 500 along the first edge 710 of the diverging member 700. Further, as the guide groove 111 of the second transportation module 110 comes into contact with the second edge 720 of the diverging member 700, the second transportation module 110 can be slid onto the fifth conveyor 520 of the rear conveyor 500 along the second edge 720 of the diverging member 700.

With the above-described configuration, the transportation module 110 placed on the first conveyor 210 of the front conveyor 200 is transferred onto the central portion of the central conveyor 300 by the first converging member 610, and, then, is transferred onto the fifth conveyor 520 of the rear conveyor 500 by the diverging member 700. Furthermore, the transportation module 120 placed on the second conveyor 220 of the front conveyor 200 is transferred onto the central portion of the central conveyor 300, and, then, is transferred onto the fourth conveyor 520 of the rear conveyor 500 by the diverging member 700.

That is to say, the branch member, i.e., the converging member 600 or the diverging member 700 is inserted into the guide groove 111 (121) of the transportation module 110 (120), and the transportation module 110 (120) is slid along a direction determined by a diagonal edge formed at the guide groove 111 (121).

Now, referring to FIG. 6, FIGS. 7A and 7B, a conveyor system according to a fourth example embodiment will be explained.

The conveyor system 10 according to the fourth example embodiment includes a guide line member 800 configured to converge transportation modules 130 and 140, which are transferred from a front conveyor 200 to a central conveyor 300, into a single row.

The front conveyor 200 includes a first conveyor 210 and a second conveyor 220 which arranged side by side in parallel to each other.

The guide line member 800 includes a first guide line 810 which is extended from the first conveyor 210 to a central portion of the central conveyor 300 and configured to slide the transportation module 130 of the first conveyor 210 to the central portion of the central conveyor 300; and a second guide line 820 which is extended from the second conveyor 220 to the central portion of the central conveyor 300 and configured to slide the transportation module 140 to the central portion of the central conveyor 300.

Figure 7A:
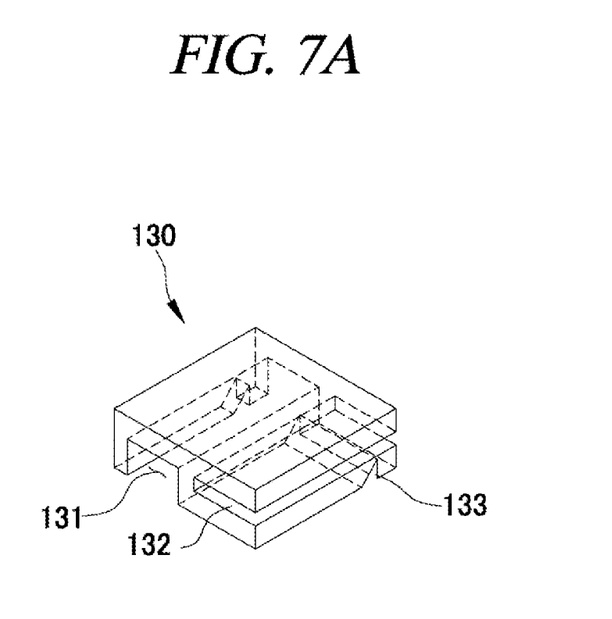
FIG. 7A is a perspective view of a first transportation module included in the conveyor system according to the fourth example embodiment.

Referring to FIG. 7A, the transportation module 130 of the first conveyor 210 has a guide line hole 131 which is bored along a transfer direction at a first side and into which the first guide line 810 is inserted. Further, the transportation module 130 is also provided with an interference prevention hole 132 formed as a recess at a side opposite the first side. Furthermore, the transportation module 130 of the first conveyor 210 also has an insertion groove 133 into which a stopper member 420 of the first conveyor 210 or a stopper member 421 of the central conveyor 300 is inserted.

That is, the transportation module 130 of the first conveyor 210 has the interference prevention hole 132 which is formed by being recessed from a right side surface of the transportation module 130 in a preset depth and a preset depth; and the guide line hole 131 which is provided on the left side of the interference prevention hole 132 and which is formed by being recessed from a bottom surface of the transportation module 130 in an upward direction in a preset width and a preset thickness along the transfer direction of the conveyor.

Figure 7B:
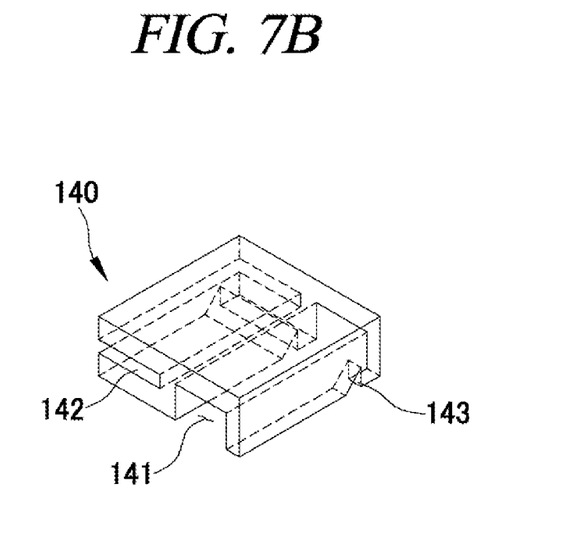
FIG. 7B is a perspective view of a second transportation module included in the conveyor system according to the fourth example embodiment.

Further, as shown in FIG. 7B, the transportation module 140 of the second conveyor 220 includes a guide line hole 141 which is bored along the transfer direction at the second side and into which the second guide line 820 is inserted. Further, the transportation module 140 is also provided with an interference prevention hole 142 which is formed as a recess at a side opposite the second side. Furthermore, the transportation module 140 of the second conveyor 220 also has an insertion groove 143 into which a stopper member 420 of the second conveyor 220 or the stopper member 421 of the central conveyor 300 is inserted.

That is to say, the transportation module 140 of the second conveyor 220 has the interference prevention hole 142 which is formed by being recessed from a left side surface of the transportation module 140 in a preset thickness and a preset depth; and the guide line hole 141 which is provided on the right side of the interference prevention groove 142 and which is formed by being recessed from the bottom surface of the transportation module 140 in the upward direction in a preset width and a preset thickness along the transfer direction of the conveyor.

Figure 6:
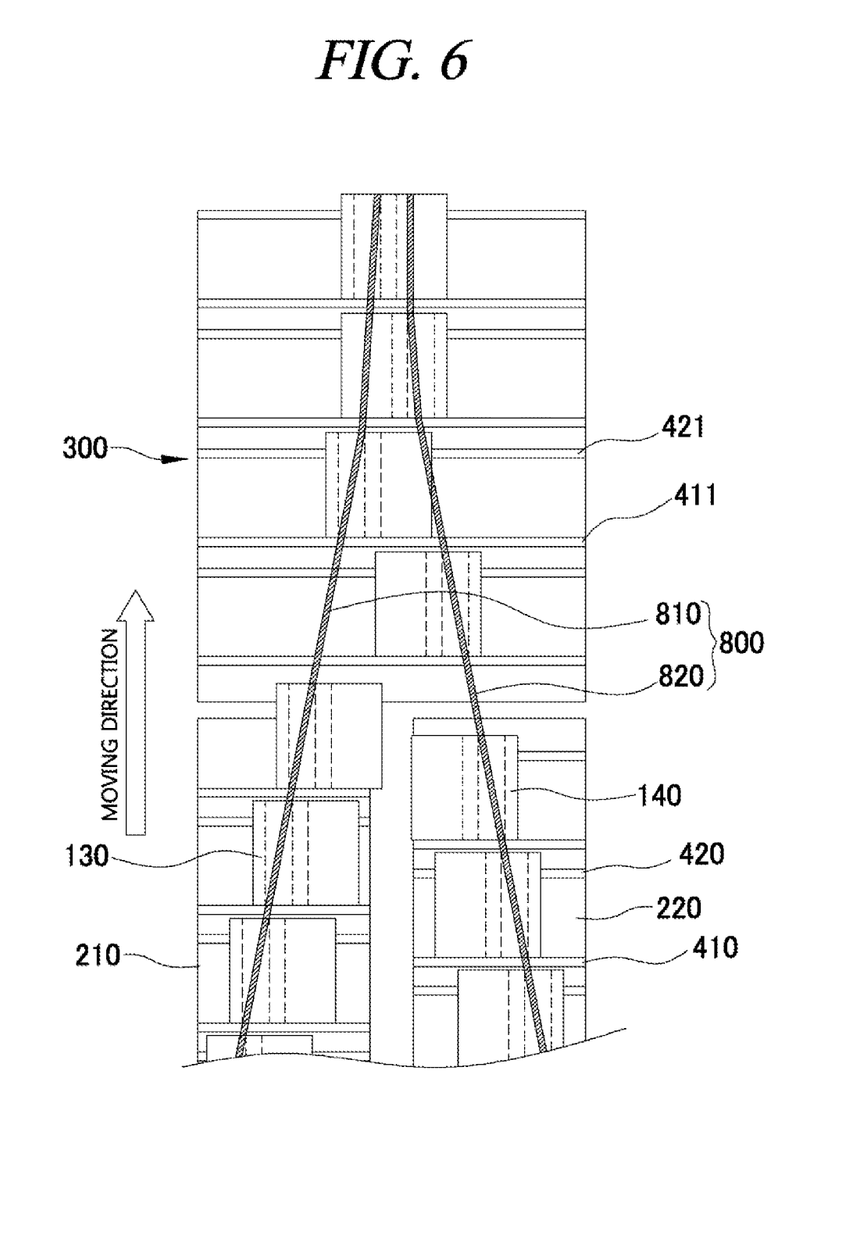
FIG. 6 is a plan view of a conveyor system according to a fourth example embodiment.

The aforementioned terms "one side" and "right side" may imply a direction of 9 o'clock of FIG. 6; and the "other side" may refer to a direction of 3 o'clock of FIG. 6. Further, the aforementioned preset width and preset depth may be set such that a predetermined gap is maintained between the guide line hole 141 and the interference prevention hole 142.

That is, the first guide line 810 is inserted through the guide line hole 131 of the transportation module 130 of the first conveyor 210, thus allowing the transportation module 130 of to be move to the central portion of the central conveyor 300 when the transportation module 130 is transferred onto the central conveyor 300 from the first conveyor 210. At this time, the stopper member 420 of the first conveyor 210 or the stopper member 421 of the central conveyor 300 is inserted into the insertion groove 133 of the transportation module 130, and, thus, the transportation module 130 can be slid in a direction orthogonal to the transfer direction.

Furthermore, the second guide line 820 is inserted through the guide line hole 141 of the transportation module 140 of the second conveyor 220, thus allowing the transportation module 140 to be moved to the central portion of the central conveyor 300 when the transportation module 140 is transferred onto the central conveyor 300 from the second conveyor 220. Accordingly, the transportation module 130 of the first conveyor 210 and the transportation module 140 of the second conveyor 220 can be arranged in a single row as they are transferred onto the central conveyor 300. At this time, the stopper member 420 of the first conveyor 210 or the stopper member 421 of the central conveyor 300 is inserted into the insertion groove 143 of the transportation module 140, and, thus, the transportation module 140 can be slid in the direction orthogonal to the transfer direction.

Here, when the transportation module 130 of the first conveyor 210 is arranged to be in the single row with the transportation module 140 of the second conveyor 220, the second guide line 820 is inserted into the interference prevention hole 132, so that the transportation module 130 can be transferred without being interfered by the second guide line 820. Further, when the transportation module 140 of the second conveyor 220 is arranged to be in the single row with the transportation module 130 of the first conveyor 210, the first guide line 810 is inserted into the interference prevention hole 142, so that the transportation module 140 can be transferred without being interfered by the second guide line 810.

By way of example, referring to FIGS. 7A and 7B, the guide line hole 131 into which the first guide line 810 is inserted may be formed by being recessed from a bottom surface of the transportation module 130 in the upward direction, and the guide line hole 141 into which the second guide line 820 is to be inserted may be formed by being recessed from a bottom surface of the transportation module 140 in the upward direction.

Figure 8:
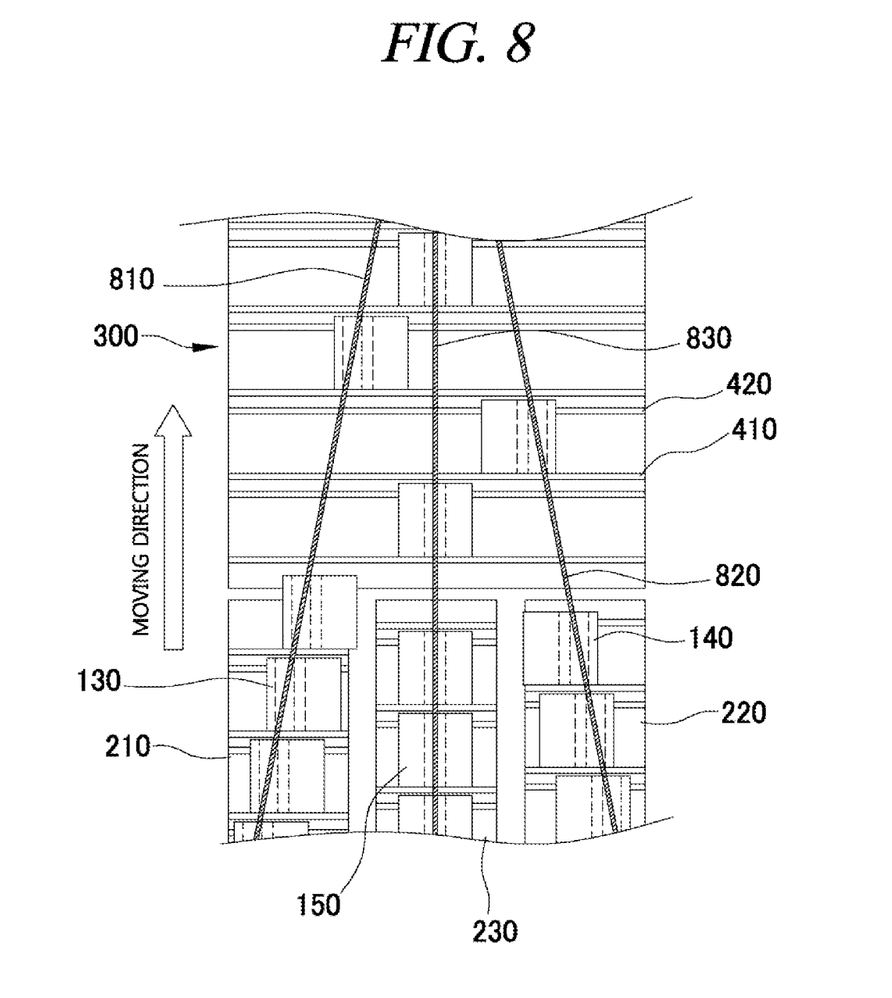
FIG. 8 is a plan view of a conveyor system according to a fifth example embodiment.

Now, referring to FIG. 8 and FIG. 9, a conveyor system according to a fifth example embodiment will be described.

The conveyor system according to the fifth example embodiment further includes a third conveyor 230 provided between a first conveyor 210 and a second conveyor 220.

Here, a guide line member 800 further includes a third guide line 830 extended from the third conveyor 230 to a central portion of a central conveyor 300 and configured to slide a transportation module 150 of the third conveyor 230 to the central portion of the central conveyor 300.

Figure 9:
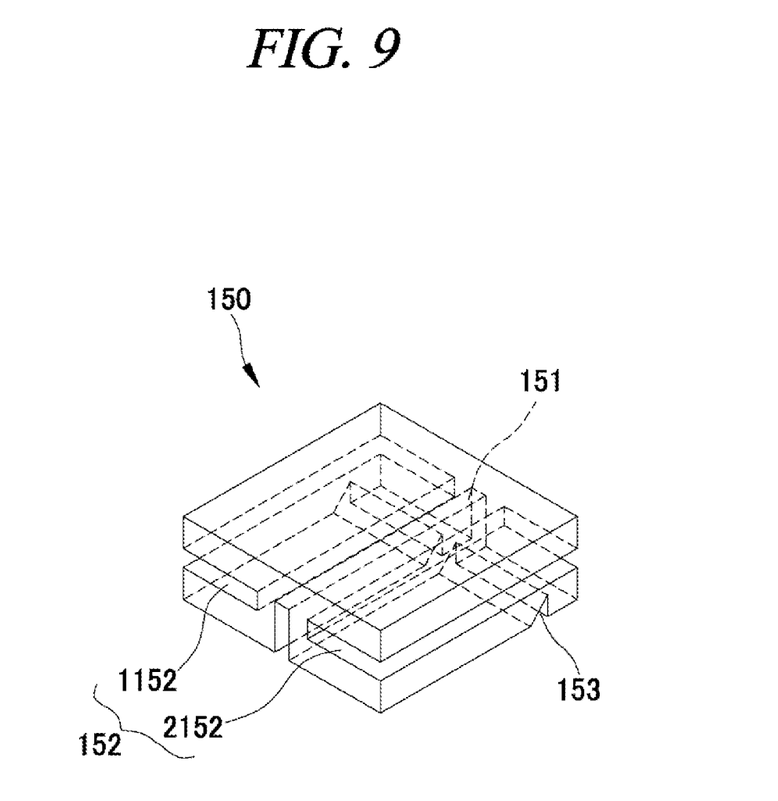
FIG. 9 is a perspective view of a transportation module included in the conveyor system according to the fifth example embodiment.

Referring to FIG. 9, the transportation module 150 transferred by the third conveyor 230 has a guide line hole 151 which is bored at a central portion thereof along a transfer direction of the conveyor and into which the third guide line 830 is to be inserted. Further, the transportation module 150 is also provided with interference prevention holes 152 respectively recessed from both side surfaces of the transportation module 150 in an inward direction.

That is, the transportation module 150 transferred by the third conveyor 230 has a first interference prevention hole 1152 which is recessed from a left side surface of the transportation module 150 in a preset thickness and a preset depth; a second interference prevention hole 2152 which is recessed from a right side surface of the transportation module 150 in a preset thickness and a preset depth; and the guide line hole 151 provided between the first and second interference prevention holes 1152 and 2152 and recessed from a bottom surface of the transportation module 150 in the upward direction in a preset width and a preset thickness along the transfer direction of the conveyor.

The aforementioned preset width and preset depth may be set such that a predetermined gap is maintained between the guide line hole 151 and the interference prevention hole 152. The interference prevention hole 152 may be provided at a position higher than an upper end of the insertion groove 153.

By way of example, as depicted in FIG. 9, the guide line hole 151 of the transportation module 150 into which the third guide line 830 is inserted may be formed by being recessed from the bottom surface of the transportation module 150 of the third conveyor 230 in the upward direction.

That is, when the transportation module 150 of the third conveyor 230 is arranged to be in the single row with a transportation module 130 of the first conveyor 210 and a transportation module 140 of the second conveyor 220 in a single row, the first guide line 810 and the second guide line 820 are inserted into the interference prevention holes 152 formed at both side surfaces of the transportation module 150. Accordingly, the transportation module 150 can be transferred without being interfered by the first guide line 810 and the second guide line 820.

Here, it should be noted that the above-described example embodiments are not intended to be anyway limiting. For example, the front conveyor 200 may include N number conveyors, and the guide line member 800 may include N number of guide lines. With such a configuration, the conveyor system of the present disclosure is capable of arranging transportation modules transferred from the N number of conveyors on the central conveyor in a single row.

Moreover, the conveyor system according to the fifth example embodiment may further include a rear conveyor 500 which is driven at a third speed, provided adjacent to an end portion of the central conveyor 300, and configured to transfer transportation modules 100 sent from the central conveyor 300. The rear conveyor 500 may include a plurality of conveyors which are arranged side by side in parallel to each other. In this configuration, the guide lime member 800 may include a plurality of guide lines extended from the central portion of the central conveyor 300 to each of the plurality of conveyors of the rear conveyor 500. With this configuration, the transportation modules 100 of the central conveyor 300 can be transferred while being divided into the plurality of conveyors of the rear conveyor 500.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

We claim:

1. A conveyor system, comprising:
a plurality of transportation modules;
a front conveyer including a multiplicity of conveyors, which are driven at a first speed, arranged side by side to be in parallel to each other and configured to transfer the transportation modules; and
a central conveyor driven at a second speed, provided adjacent to an end portion of the front conveyor and configured to transfer the transportation modules transferred from the front conveyor,
wherein each of the front conveyor and the central conveyor includes a plurality of stopper members configured to prevent each transportation module from being pushed forward or backward while guiding a side sliding transfer of the transportation module, and
the transportation module includes an insertion groove into which a corresponding one of the stopper members is inserted.

2. The conveyor of claim 1,
wherein the plurality of stopper members include a multiplicity of first stopper members and a multiplicity of second stopper members which are arranged apart from each other at a preset distance,
the transportation module is provided between the multiplicity of first stopper members,
a height of each first stopper member is lower than a height of each second stopper member, and
the second stopper member is inserted into the insertion groove of the transportation module.

3. The conveyor system of claim 2,
wherein the transportation module includes a step portion provided at a front end portion of the insertion groove, and
a height of the step portion from a bottom surface of the conveyor is set to be higher than the height of the first stopper member.

4. The conveyor system of claim 1, wherein the second speed is higher than the first speed.

5. The conveyor system of claim 1,
wherein the front conveyor includes a first conveyor and a second conveyor which are arranged side by side to be in parallel to each other, and the conveyor system further comprises a converging member which is provided at a position where transportation modules are transferred from the front conveyor to the central conveyor and is configured to converge a first one of the transportation modules transferred from the first conveyor and a second one of the transportation modules transferred from the second conveyor into a single row, wherein the converging member includes a first converging member which is provided on the side of the first conveyor and configured to slide the first one of the transportation modules from the first conveyor to a central portion of the central conveyor, and a second converging member which is provided on the side of the second conveyor and configured to slide the second one of the transportation modules from the second conveyor to the central portion of the central conveyor.

6. The conveyor system of claim 5, wherein the first converging member includes an edge extending from a first side end portion of the first conveyor toward a central portion of the central conveyor, the second converging member includes an edge extending from a second side end portion of the second conveyor toward the central portion of the central conveyor, and the transportation modules transferred by the first conveyor module each includes a first guide groove into which the edge of the first converging member is inserted, and the transportation modules transferred by the second conveyor each includes a second guide groove into which the edge of the second converging member is inserted.

7. The conveyor system of claim 6, further comprising:

a rear conveyor which is driven at a third speed, provided adjacent to an end portion of the central conveyor and configured to transfer transportation modules transferred from the central conveyor.

8. The conveyor system of claim 7, wherein the rear conveyor includes a fourth conveyor and a fifth conveyor which are arranged side by side in parallel to each other and configured to transport the transportation modules, and the conveyor system further comprises a diverging member which is provided at a position where transportation modules are transferred from the central conveyor to the rear conveyor and is configured to diverge the transportation modules transferred from the central conveyor onto the fourth conveyor and the fifth conveyor, wherein the diverging member includes a first edge extending from a central portion of the central conveyor to a first side end portion of the fourth conveyor and a second edge extended from the central portion of the central conveyor to a second side end portion of the fifth conveyor.

9. The conveyor system of claim 1, wherein the front conveyor includes a first conveyor and a second conveyor which are arranged side by side in parallel to each other, and the conveyor system further comprises a guide line member configured to converge transportation modules transferred from the front conveyor to the central conveyor into a single row, wherein the guide line member includes a first guide line extended from the first conveyor to the central portion of the central conveyor and configured to slide a first one of the transportation modules of the first conveyor to the central portion of the central conveyor, and a second guide line extended from the second conveyor to the central portion of the central conveyor and configured to slide a second one of the transportation modules of the second conveyor to the central portion of the central conveyor.

10. The conveyor system of claim 9, wherein the first one of the transportation modules transferred by the first conveyor includes a first guide line hole which is bored along a transfer direction at a first side and into which the first guide line is inserted, and also includes a first interference prevention hole formed as a recess at a side opposite the first side, and the second one of the transportation modules transferred by the second conveyor includes a second guide line hole which is bored along the transfer direction at the second side and into which the second guide line is inserted, and also includes a second interference prevention hole formed as a recess at a side opposite the second side.

11. The conveyor system of claim 9, wherein the front conveyor further includes a third conveyor provided between the first conveyor and the second conveyor, the guide line member further includes a third guide line extended from the third conveyor to the central portion of the central conveyor and configured to slide a third one of the transportation modules of the third conveyor to the central portion of the central conveyor, and the third one of the transportation modules transferred by the third conveyor includes a guide line hole which is formed at a central portion thereof along the transfer direction and into which the third guide line is inserted, and also includes interference prevention holes formed at both side surfaces thereof as recesses in an inward direction.

12. A transportation module which is transferred by a conveyor, comprising:

a top surface on which a transportation target object is placed;

a bottom surface which is in contact with a main surface of the conveyor;

a left side surface and a right side surface provided between the top surface and the bottom surface;

a front side surface and a rear side surface provided between the top surface and the bottom surface; and an insertion groove;

wherein a distance between the rear side surface and the insertion groove is set to correspond to a distance between a first stopper member and a second stopper member protruded from the main surface of the conveyor and wherein a second stopper member is inserted into the insertion groove.

13. The transportation module of claim 12, wherein a step portion is formed at a front end portion of the insertion groove at the bottom surface, and a height of the step portion from the bottom surface is larger than a height of the first stopper member.

14. The transportation module of claim 12, wherein the insertion groove is formed in a direction parallel to the front side surface or the rear side surface.

15. The transportation module of claim 12, further comprising:

a guide groove formed as a recess extending from the left side surface and the front side surface in a preset thickness and a preset depth, wherein the guide groove extends up to a diagonal line connecting a rear end point of the left side surface and a right end point of the front side surface, and is provided at a position higher than an upper end of the insertion groove.

16. The transportation module of claim 12, further comprising:

a guide groove formed as a recess extending from the right side surface and the front side surface in a preset thickness and a preset depth, wherein the guide groove extends up to a diagonal line connecting a rear end point of the right side surface and a left end point of the front side surface, and is provided at a position higher than an upper end of the insertion groove.

17. The transportation module of claim 16, wherein a branch member configured to guide the transportation module to be moved in a diagonal direction is inserted into the guide groove, and the transportation module is slid along a direction determined by a diagonal edge formed at the guide groove.

18. The transportation module of claim 12, further comprising:

an interference prevention hole formed as a first recess extending from either one of the left side surface and the right side surface of the transportation module in a first preset thickness and a first preset depth; and a guide line hole provided at an area opposite to the left side surface or the right side surface where the interference hole is provided and formed as a second recess extending from the bottom surface of the transportation module in an upward direction in a second preset width and a second preset thickness along a transfer direction, wherein the first and second preset width and preset depth are set to maintain a predetermined gap between the guide line hole and the interference prevention hole, and the interference prevention hole is provided at a position higher than the upper end of the insertion groove.

19. The transportation module of claim 12, further comprising:

a first interference prevention hole formed as a first recess extending from the left side surface of the transportation module in a first preset thickness and a first preset depth;

a second interference prevention hole formed as a second recess extending from the right side surface of the transportation module in a second preset thickness and a second preset depth; and a guide line hole provided between the first interference prevention hole and the second interference prevention hole and formed as a third recess extending from the bottom surface of the transportation module in an upward direction in a third preset width and a third preset thickness along a transfer direction, wherein the first, second and third preset width and preset depth are set to maintain a predetermined gap between the guide line hole and the first and second interference prevention holes, and the interference prevention holes are located at positions higher than the upper end of the insertion groove.

* * * * *